US00RE37680E

(19) United States
(12) Reissued Patent
Bhagavatula

(10) Patent Number: US RE37,680 E
(45) Date of Reissued Patent: Apr. 30, 2002

(54) DISPERSION SHIFTED OPTICAL WAVEGUIDE FIBER

(75) Inventor: Venkata A. Bhagavatula, Big Flats, NY (US)

(73) Assignee: Corning Incorporated, Corning, NY (US)

(21) Appl. No.: 09/271,079

(22) Filed: Mar. 17, 1999

Related U.S. Patent Documents

Reissue of:
(64) Patent No.: 5,613,027
Issued: Mar. 18, 1997
Appl. No.: 08/287,262
Filed: Oct. 17, 1994

(51) Int. Cl.[7] ..... G02B 6/02; G02B 6/16
(52) U.S. Cl. ..... 385/123; 385/124; 385/128; 385/142
(58) Field of Search ..... 385/123, 124, 385/126, 127, 128, 142

(56) References Cited

U.S. PATENT DOCUMENTS

| | | | | |
|---|---|---|---|---|
| 3,973,828 | A | 8/1976 | Onoda et al. | 385/123 X |
| 3,980,390 | A | 9/1976 | Yamamoto et al. | 385/123 X |
| 4,062,665 | A | 12/1977 | Izawa et al. | 65/3 |
| 4,179,187 | A | 12/1979 | Maurer | 385/123 X |
| 4,242,375 | A | 12/1980 | Shiraishi et al. | 427/163 |
| 4,358,181 | A | 11/1982 | Gulati et al. | 427/163 X |
| 4,599,098 | A | 7/1986 | Sarkar | 65/385 X |
| 4,715,679 | A | 12/1987 | Bhagavatula | 385/123 X |
| 4,802,733 | A | 2/1989 | Bachmann et al. | 65/3.11 X |
| 5,210,816 | A | 5/1993 | Iino et al. | 385/142 |
| 5,613,027 | A * | 3/1997 | Bhagavatula | 385/123 |

FOREIGN PATENT DOCUMENTS

| | | | |
|---|---|---|---|
| DE | 2302556 | 7/1974 | 385/123 X |
| EP | 0 307 228 | 3/1989 | 385/123 X |
| GB | 2002535 | 2/1979 | 385/123 X |
| JP | 51-134138 | 5/1975 | 385/123 X |
| JP | 62-297808 | 12/1987 | G02B/6/18 |

OTHER PUBLICATIONS

S.F. Mahmoud & A.M. Kharbat, "Transmission Characteristics of a Coaxial Optical Fiber Line", Journal of Lightwave Technology, vol. 11, No. 11, Nov. 1993.
Radio Engineering & Electronic Physics, vol. 22, No. 12, Dec. 1977; pp. 1–11, A.S. Belanow, "Filtering of Higher Order Modes in Optical Waveguides".

* cited by examiner

*Primary Examiner*—Brian Healy
(74) *Attorney, Agent, or Firm*—Robert L. Carlson

(57) ABSTRACT

A single mode optical waveguide fiber designed for high data rate, or WDM systems or systems incorporating optical amplifiers. The optical waveguide has a compound core having a central region and at least one annular region surrounding the central region. A distinguishing feature of the waveguide core is that the minimum refractive index of the central core region is less than the minimum index of the adjacent annular region. A relatively simple profile design has the characteristics of ease in manufacturing together with, flexibility in tailoring $D_w$ to yield a preselected zero dispersion wavelength, dispersion magnitude over a target wavelength range, and dispersion slope. The simplicity of profile gives reduced polarization mode dispersion.

33 Claims, 3 Drawing Sheets

FIG.1 (Prior Art)
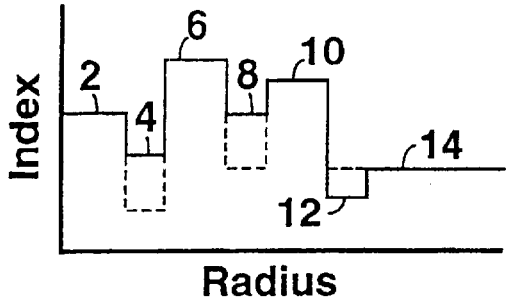
FIG. 2a
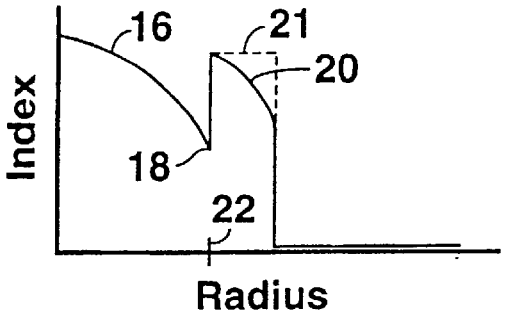
FIG. 2b
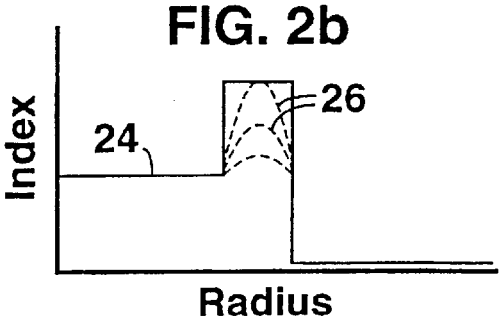
FIG. 2c
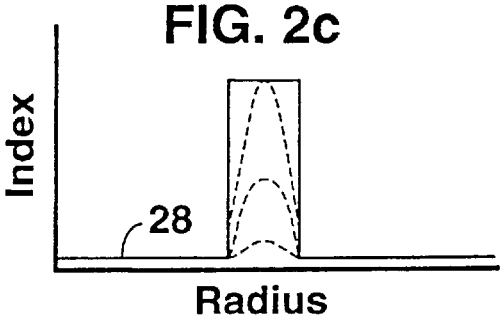
FIG. 2d
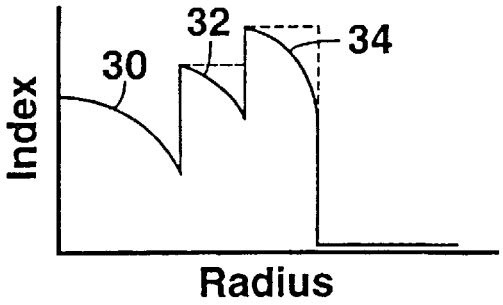
FIG. 2e
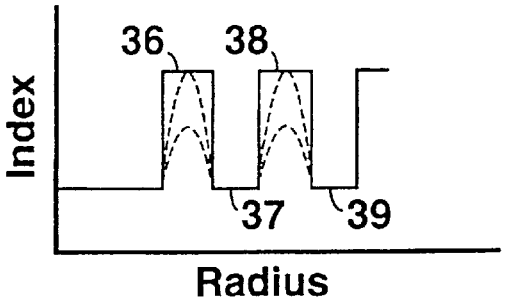
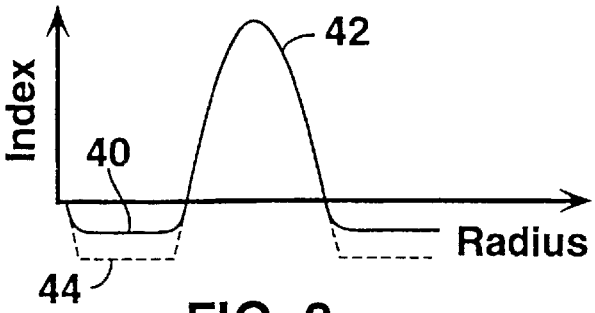
FIG. 3
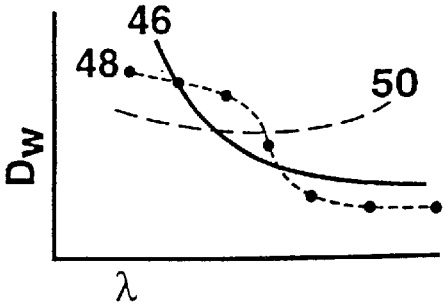
FIG. 4

DISPERSION SHIFTED OPTICAL WAVEGUIDE FIBER

Matter enclosed in heavy brackets [ ] appears in the original patent but forms no part of this reissue specification; matter printed in italics indicates the additions made by reissue.

BACKGROUND

The invention is directed to a single mode optical waveguide fiber wherein a refractive index profile design is optimized for high data rate links, or systems using optical amplifiers, or wavelength division multiplexed systems.

The full capability of optical waveguide fiber is being exploited by high data rate systems having a long distance between repeaters. The operating window in a range including 1550 nm is attractive for these systems because of the lower attenuation possible and the absence of absorption peaks. Data rates typical of such systems are greater than 1 gigabit/sec and repeater spacing exceeds 50 km.

The high data rates require that the birefringence of the waveguide fiber be low. That is, the dispersion of the polarizations of the single propagated mode must be controlled to limit bit errors. The high data rates also require that the zero dispersion wavelength be near 1550 nm to limit material dispersion. Furthermore, the introduction of high powered lasers has produced non-linear effects which can limit data rate or repeater spacing. In systems which utilize wavelength division multiplexing over a relatively small wavelength range, the non-linear interference effect called four wave mixing (FWM) is especially detrimental.

One approach to limiting polarization mode dispersion (PMD) is to provide a waveguide fiber which is relatively free of birefringence. This may be accomplished by maintaining circularly symmetric geometry and by limiting residual stress in the fiber. In addition, a waveguide having a relatively lower dopant level in the signal carrying portion of the waveguide will have reduced Rayleigh scattering and will reduce bit errors due to non-linear effects.

The impact of non-linear effects can also be lessened by providing a larger mode field diameter to reduce power density in the waveguide fiber. Four wave mixing can essentially be eliminated by moving the zero dispersion wavelength out of the operating window. A non-zero dispersion over the operating window serves to prevent the phase matching of multiplexed signals thereby eliminating the four wave mixing signal interference.

The objectives, therefore, in manufacturing a waveguide fiber for high data rate, long repeater spacing and multichannel operation are to provide:

- low residual stress;
- reduced overlap of signal with higher dopant waveguide regions;
- higher modefield; and,
- dispersion zero away from the operating window.

Further, these properties must be achieved while maintaining low attenuation, acceptable bend performance and appropriate cut off wavelength. An added benefit can be realized if the performance goals can be met without increasing manufacturing difficulty or cost.

SUMMARY OF THE INVENTION

The present invention fulfills the requirements for a high performance waveguide fiber. Further, a waveguide of the inventive design is relatively easier to manufacture and thus is lower in manufacturing cost.

A major feature of this invention, which distinguishes it from other compound core profile designs, is that a central core region is maintained relatively low in dopant content. This central region is adjacent to a region relatively higher in dopant content. The advantageous result is a profile design flexible enough to satisfy an exacting specification but simple enough to allow ease of manufacture using standard equipment. The inventive profile effectively controls index on centerline and moves the index peak to an off centerline position.

A first aspect of the invention is a single mode optical waveguide fiber having a compound core. A central region of the core has a minimum refractive index $n_0$ and a radius $a_0$. The central core region is surrounded by at least one annular core region where the innermost of the annular regions has a minimum refractive index $n_i$ and a radius $a_i$ and where $n_i>n_0$ and $a_i>a_0$. The core is surrounded by a cladding layer having refractive index $n_c$ where $n_i>n_c$. The highest index point of the central core region may occur at or near the waveguide axial centerline.

In general, the refractive index of the central region and the refractive indices of the at least one surrounding annular region may vary with radius. A preferred embodiment of the inventive refractive index profile is one in which the refractive index in each core region is essentially cylindrically symmetrical.

In another preferred embodiment, the waveguide profile is essentially cylindrically symmetric and the core comprises one annular region surrounding the central core region.

A most preferred embodiment has a cylindrically symmetric waveguide refractive index and a core refractive index profile including a substantially constant index over a single annular region surrounding the central core region. The central core region index may also be substantially constant in this embodiment. Further, the central core region index may be substantially equal to the refractive index of the cladding, i.e., the central core % delta is inside the range +/−0.1%.

Also contemplated are designs which reduce the refractive index, relative to the refractive index of silica, of all or part of any of the core regions or all or part of the clad layer.

Another aspect of the invention is a waveguide fiber having a central core surrounded by two annular regions having respective minimum refractive indices $n_1$ and $n_2$. The first annular region is adjacent the central core region and the second annular region surrounds and is adjacent to the first annular region. The relationship of the refractive indices of the respective regions is $n_1>n_0$ and $n_2>n_0$, where $n_0$ is the central core region minimum refractive index.

A further aspect of the invention is a single mode optical waveguide fiber including a central core region having a substantially constant refractive index $n_0$. The central core region is surrounded by at least one annular region. The annular region adjacent the core has minimum refractive index $n_i$, where $n_i>n_0$. The waveguide has a clad layer having refractive index $n_c$ surrounding the core region.

In a preferred embodiment, the substantially constant refractive index of the central core region is substantially equal to the refractive index of the clad layer. In this embodiment the total dispersion slope can be less than about 0.05 ps/nm$^2$/km. The maximum dispersion slope of this embodiment is typically no greater than 0.075 ps/nm$^2$/km. The embodiment is relatively free of draw induced residual stress and stress due to thermal expansion mismatch. In addition, the zero dispersion wavelength is relatively insensitive to changes in cut off wavelength or core diameter. A change of about 5% in either cut off wavelength or core diameter produces substantially no change in zero dispersion wavelength. Furthermore, in this embodiment the zero dispersion wavelength can be moved away from the operating wavelength range to a wavelength less than about 1530 nm or greater than about 1565 nm.

Yet another aspect of the invention is a single mode optical waveguide fiber including a core having an axially symmetric central region of minimum refractive index $n_0$ surrounded by an axially symmetric annular region of minimum refractive index $n_1$, an inner radius $a_i$ and an outer radius $a_o$, where $n_1>n_0$ and the ratio $a_i/a_o$ is in the range of about 0.35 to 0.80. The core is surrounded by a clad layer of refractive index $n_c$, where $n_1>n_c$.

In preferred embodiments of this aspect, $n_0$ is substantially constant, or $n_0$ is substantially equal to $n_c$, or $n_1$ is substantially constant. A preferred value of $n_1$ is in the range of about 1.4700 to 1.4800.

Other features and advantages of the inventive refractive index profile will be described in the detailed description in conjunction with the following drawings.

BRIEF DESCRIPTION OF THE DRAWINGS

FIG. 1 is an example of compound core optical waveguide fiber prior art.

FIGS. 2a–e are illustrations of several embodiments of the inventive refractive index profiles charted versus radial position in the waveguide.

FIG. 3 is an illustration of an embodiment wherein a part of the central core region and a part of the clad layer have a refractive index less than the index of silica.

FIG. 4 is an illustrative charts showing three alternative waveguide dispersion curves possible using the inventive profile.

DETAILED DESCRIPTION OF THE INVENTION

Figure 5:
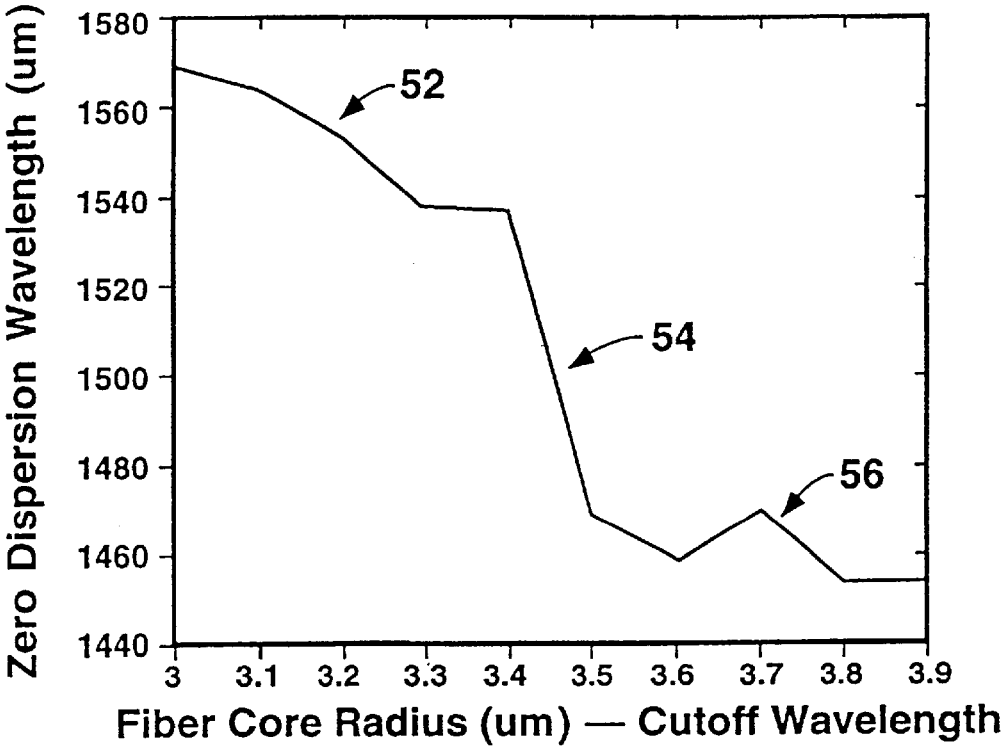
FIG. 5 is an illustrative chart showing an example of the dependence of zero dispersion wavelength on the waveguide core radius.

The drawings are intended to aid in understanding the invention and in no way limit the invention. The drawings are not necessarily to scale.

The terms refractive index and index profile and index are used interchangeably.

The radii of successive regions of the core are defined in terms of index of refraction. Thus the central core region has a radius which is defined as the distance from the core center to a point on the core diameter whereat the refractive index has a prescribed value characterizing the end of the central region. The inner and outer radii of annular core regions are defined analogously. For example, the inner radius of an annular core region is the radius at which the refractive index has a prescribed value characterizing the beginning of an annular region.

An early example of the use of a compound core design to provide a waveguide which meets a wide range of specifications is found in U.S. Pat. No. 4,715,679, Bhagavatula, incorporated herein by reference. The '679 patent shows how the introduction of a plurality of core regions having various dimension and refractive index provides the flexibility to construct a waveguide having a particular waveguide dispersion. As defined in the '679 patent, the total dispersion, $D_t$, is the algebraic sum of the material dispersion, $D_m$, and the waveguide dispersion, $D_w$. A waveguide can be tailored to meet a specified set of properties including, cut off wavelength, zero dispersion wavelength, and mode field diameter.

An example of a compound profile of the '679 patent is shown in the index versus radial position chart in FIG. 1. The center region 2 is surrounded by adjacent region 4 wherein region 4 in general has a lower refractive index than region 1. The remainder of the core is comprised of successive regions 6, 8, and 10. The refractive index profile in the respective regions may have essentially any shape. The dashed lines in regions 4 and 8 indicate the refractive index is not limited to a particular value. The core is surrounded by a cladding layer 14 which may have a depressed region 12.

In contrast to this art is the inventive compound core profile, one embodiment of which is illustrated in FIG. 2a. In this embodiment, the central region of the core, delimited by radius 22, has a refractive index profile 16 of general shape with minimum point 18. The annular region of the core adjacent the central region has an index profile 20 of general shape. The dashed line 21 indicates an alternative index profile for the annular region. No point of index 20 is less than minimum point 18. Even with this distinguishing limitation imposed, it has been found possible to devise index profiles which tailor waveguide dispersion and so provide for flexibility in designing an optical waveguide having a particular set of characteristics.

In another embodiment, the index profile in the central core region is substantially constant as shown by 24 in FIG. 2b. The adjacent annular region has index profile 26. The dashed lines in the annular region of the profile in FIG. 2b indicate the index profile 26 may vary from point to point along the radius. The waveguide fiber made in accord with the index profile of FIG. 2b is preferred, in terms of the ease of manufacture, providing the pertinent specification can be met using such a profile.

A further simplification of the inventive profile is illustrated in FIG. 2c. In this embodiment, the central region 28 is substantially constant and substantially equal to the refractive index of the clad layer. The annular region adjacent the central core region may have a general shape which varies with radial position.

A waveguide fiber made in accord with the profile of FIG. 2c is preferred because:

- the index profile is readily manufactured using standard equipment;
- the uniformity of composition (only one annular region contains a dopant) results in less waveguide stress due to thermal mismatch; and,
- the simplicity of the design can result in improved circularity and concentricity of the core regions and the clad layer. The ease of manufacture translates directly to cost reduction. The reduced thermal mismatch stress and the improved geometry translate directly into reduced polarization mode dispersion.

In addition to these benefits, the core still has sufficient flexibility to allow for tailoring of the waveguide dispersion, $D_w$, to meet a wide range of waveguide applications. In particular, a waveguide fiber made in accord with the index profile of FIG. 2c has been tailored to exhibit the properties required for high data rate systems which employ wavelength division multiplexing or which require long repeater spacing or which use optical amplifiers.

EXAMPLE

Figure 8:
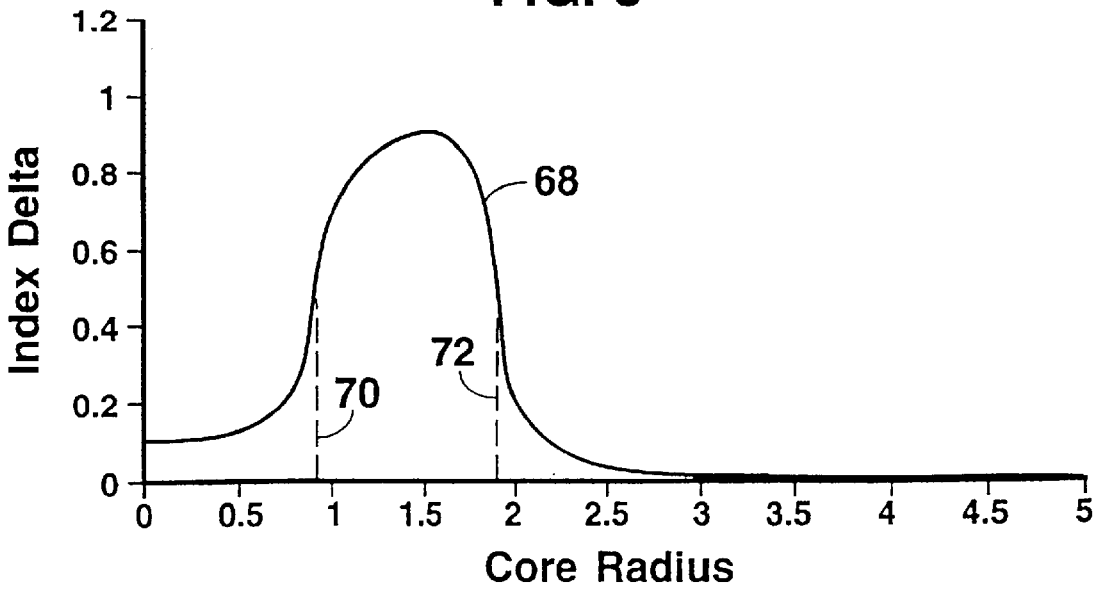
FIG. 8 is a chart of an actual example of the inventive index profile.

A single mode optical waveguide fiber was manufactured having an index profile similar to that shown in FIG. 2c. The waveguide had a single annular core region of inner radius 0.93 and outer radius 1.9. The index delta of the annual region was about 0.9%, where, index delta=$(n_{max}^2-n_c^2)/2n_{max}^2$, and $n_{max}$ is the maximum index of the annular core region. The index profile of the annulus was essentially a step with the top and bottom corners rounded due to diffusion of the $GeO_2$ dopant. The profile is shown as curve 68 in FIG. 8. Note that the inner and outer radius, points 70 and 72, are found by drawing perpendicular lines to the x-axis from about the half maximum index points.

The central core region had a substantially constant index profile of index delta 0.1%. The cladding layer was $SiO_2$.

The waveguide fiber properties were:

mode field diameter—8.2 microns;

dispersion zero—1593 nm;

dispersion slope—0.044 ps/km-nm$^2$; and,

PMD—0.031 ps/km$^{1/2}$.

Note that these properties meet the requirements, known in the art, for high data rate systems, or WDM systems, or systems using optical amplifiers.

Using the example profile design, it was found that the zero dispersion wavelength could be shifted to essentially any point in the wavelength range from about 1475 to 1600 nm.

TABLE I

| $a_f$ | Disp. Zero | Slope | Cut Off | PMD |
|---|---|---|---|---|
| 1.10 | 1486 | 0.062 | 1099 | 0.055 |
| 1.06 | 1535 | 0.073 | 1000 | 0.088 |
| 0.93 | 1593 | 0.439 | 929 | 0.031 |

Table I. is a comparison of properties of two additional waveguide fibers essentially identical to the waveguide of example 1 except for the inner radius $a_i$ and outer radius $a_0$ of the annulus. The ratio, $a_i/a_o$, is the same for the three waveguides. The last row of the table is the waveguide of example 1. The trends in the data for zero dispersion wavelength and cut off wavelength versus $a_i$ are clear. The table also shows that total dispersion slope and polarization mode dispersion depend upon more than just the placement of $a_i$ and $a_o$ as is discussed below.

Additional embodiments of the inventive profile are shown in FIGS. 2d & 2e and in FIG. 3. FIG. 2d has a central core region 30 wherein the index can vary with radius. Two annular regions, 32 and 34 respectively, surround the central region and in general may vary with radius. The dashed lines indicate that any of the regions may be constant or have a different shape from that shown. That is, the distinguishing feature is that the maximum central core index is less than the minimum index in the annular core region adjacent the central region.

FIG. 2e shows the embodiment wherein there are several successive annular regions, 36, 37, 38, and 39. The number of such regions is limited only by the practical considerations of minimum annular thickness required to interact with a light signal and the maximum size of the core region in view of the target cut off wavelength.

A further generalization of the inventive waveguide fiber includes regions wherein the refractive index is lower than the index of silica. FIG. 3 shows a single annulus 42 and regions 40 and 44 having an index below that of silica. Such an index profile may be less desirable from the standpoint of cost and ease of manufacture.

It is advantageous, both from the standpoint of cost and ease of manufacturing to specification, that a simple embodiment of the inventive profile allows appropriate tailoring of the waveguide dispersion. FIG. 4 shows three waveguide dispersion curves possible using the embodiment illustrated in FIG. 2c. Curve 46 is the calculated $D_w$ for this embodiment wherein the ratio of inner to outer radius of the annulus is in the range of about 0.35 to 0.45. Curve 48, which shows substantially linear regions at shorter and longer wavelengths separated by a transition region at intermediate wavelengths, is modelled using a ratio of about 0.5. Curve 50, which is substantially constant over a wide wavelength range, was calculated using a ratio in the range of about 0.55 to 0.75. Other $D_w$ curves may be obtained by choosing the appropriate values for the variables, inner radius, outer radius, and index profile in the central core and annular core regions. In particular, $D_w$ curves having a concavity opposite to that of curve 46 may be achieved.

Because the material dispersion, $D_m$, does not change rapidly with changes in the waveguide variables noted immediately above, changes in the shape of the $D_w$ curve produce corresponding changes in total dispersion $D_t$. $D_m$ is taken to be positive by generally accepted convention. And $D_w$ is therefore negative because it has an opposite effect on signal velocity relative to $D_m$. Thus curve 46 will produce a $D_t$ which has a low slope, of the order of about 0.05 ps/nm$^2$-km, over a particular wavelength range, because the material and waveguide dispersion will substantially cancel each other over that range. This design gives a dispersion zero which will change more rapidly with changes in core diameter and cut off wavelength compared to the design which produces curve 50. In this latter case, the slope of total dispersion is increased, to about 0.075 ps/nm$^2$-km, so that the zero of $D_t$ varies less as core diameter or cut off wavelength vary. A preferred slope range for ease of manufacture while maintaining low dispersion over a range of wavelengths is about 0.055 to 0.060 ps/nm$^2$-km. Note that different parts of the $D_w$ curve may have different slopes, as is shown in curve 48. The different slopes may be located in different wavelength regions. Thus a wide range of magnitudes and shapes of $D_t$ may be achieved. In general, the design may be optimized to meet a targeted balance between ease of manufacture and the magnitude of the total dispersion over a selected wavelength range.

Figure 6:
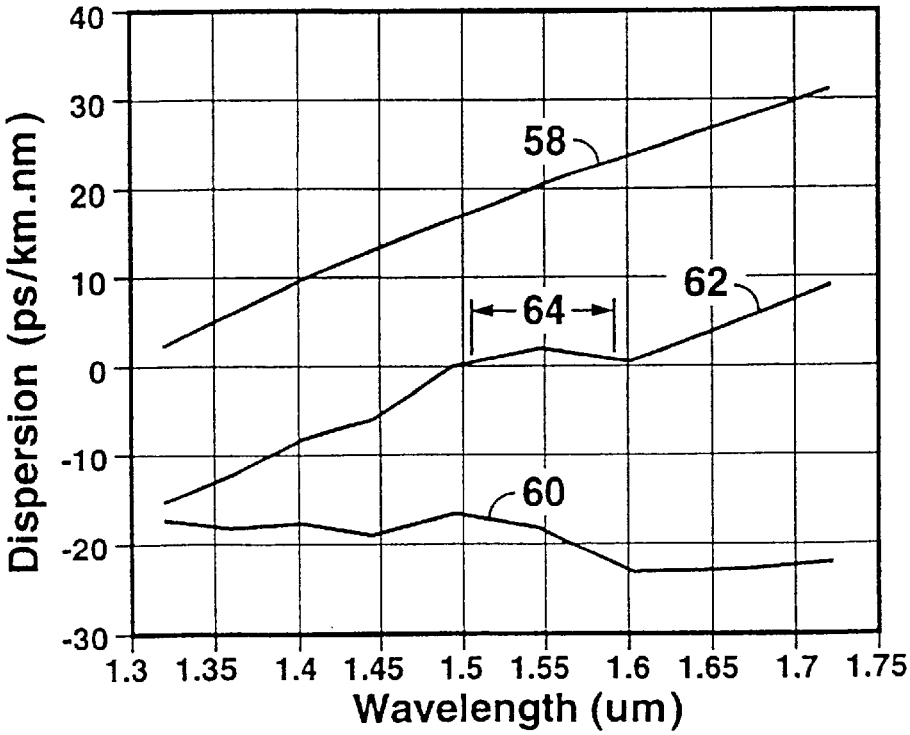
FIG. 6 is an illustrative chart showing an example of total dispersion, material dispersion and waveguide dispersion.

FIG. 6 shows a representative $D_m$ curve 58 and a particular $D_w$ curve 60 using the single annulus embodiment of the inventive index profile. The resulting $D_t$ curve 62 has a characteristic region 64, which includes a wavelength range from about 1520 nm to 1600 nm, wherein the total dispersion is in the range of about 0.5 ps/nm-km to 4 ps/nm-km. This characteristic is ideal for high data rate, wavelength division multiplexing (WDM) in the 1550 nm operating window, because dispersion is low enough for high data rate but still sufficient to prevent FWM.

Note that the dispersion zero in FIG. 6 is near 1500 nm. The inventive profile can be used to place dispersion zero at another target wavelength, viz., 1565 nm or greater. For example, dispersion zero for a high data rate submarine system may be chosen to be in about a 10 nm range about 5 nm above or below the gain peak of an optical amplifier. Typically this gain peak is near 1558 nm. Thus an optimum choice to limit non-linear effects and allow optimum use of optical amplifier spacing would be dispersion zero near but not at the amplifier gain peak, for example, in the range of about 1545 nm to 1555 nm or about 1560 nm to 1570 nm. A waveguide so designed is particularly suited for use in a long length system which does not employ WDM, such as a single wavelength submarine system. The zero dispersion wavelength of the inventive optical waveguide can be placed at essentially any desired wavelength.

Theoretical studies of the inventive profile show that choosing zero dispersion in the range of about 1500 nm to 1530 nm is preferred for high rate WDM systems because:

- a total dispersion slope of 0.05 ps/nm$^2$-km can be achieved;
- manufacturing is relatively easier;
- bend performance is better; and,
- total dispersion over a range of about 1540 nm to 1560 nm is in the range of about 0.5 to 2.5 ps/nm-km. Further, the total dispersion is positive, according to the sign convention noted above, a condition essential for soliton systems.

It will be understood that although the examples deal primarily with the 1550 nm window, the concept of using the inventive index to tailor $D_w$ to obtain a target $D_t$ curve may be extended to include operating windows above or below the 1550 nm window. For example it is contemplated that through use of suitable index altering dopants, a waveguide capable of high rate, WDM operation at 1300 nm or at wavelengths substantially above 1550 nm can be designed.

FIG. 5 serves to illustrate the flexibility of the single annulus embodiment of the inventive profile in terms of placement of zero dispersion wavelength. The core radius, i.e., the outer radius of the annulus, is shown on the x-axis. The zero dispersion wavelength is shown on the y-axis. In the relatively low slope part of the curve, 52, zero dispersion wavelength varies from about 1570 nm to 1535 nm as radius varies from 3 microns to about 3.4 microns. The part of the curve labelled 56 is also low slope and zero dispersion varies between about 1470 nm and 1455 nm as radius varies from about 3.5 to 3.9 microns. For the particular embodiment of FIG. 5, a radius between 3.4 and 3.5 microns, segment 54, would give wide variations in zero dispersion wavelength for relatively small changes in radius. This region could be used to effectively randomize dispersion zero and thereby manage total dispersion within a waveguide system.

The single or multiple annulus core profile design will have reduced polarization mode dispersion because:

- the design is simple and therefore geometry tolerances will be relatively easy to control in manufacturing, i.e., core and clad roundness and concentricity will be improved;
- those designs which have low dopant level in the central region of the core have relatively less overlap between the field of the propagating signal and the high dopant core region.

Figure 7:
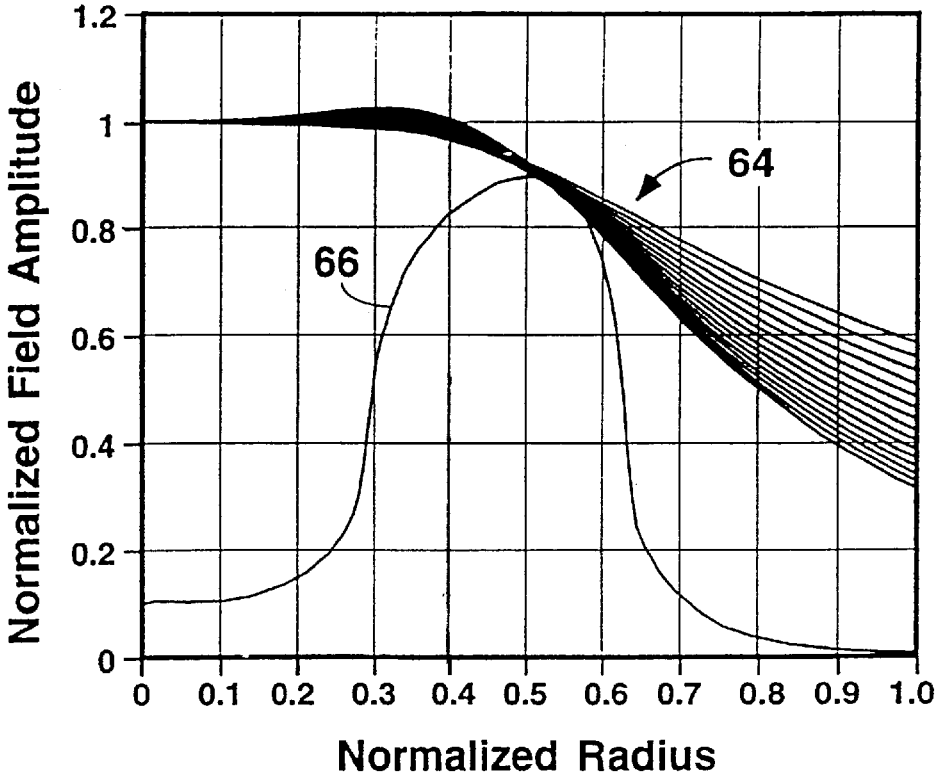
FIG. 7 is an illustrative chart showing an example of the signal field amplitude relative to the index profile of an embodiment of the inventive profile.

For a single annulus design the power distribution of the signal relative to the index profile is shown in FIG. 7. The index profile of the waveguide is illustrated by curve 66. A family of field intensity curves, 64, are plotted on the same chart. Each member of the family of curves has a different V value. The curves show power density is highest in the core region having the lowest dopant level, i.e., the region where polarization birefringence is least likely to occur. The coincidence of high power density with lowest dopant level also produces the advantages of lower Rayleigh scattering and lower impact of non-linear effects, such as self phase modulation or FWM.

Thus the inventive refractive index profile, in its several embodiments, offers flexibility of design together with ease of manufacture. In particular, the inventive profile may be chosen:

- to select a particular range for the zero dispersion wavelength;
- the zero dispersion wavelength may be made relatively insensitive to manufacturing variations in core radius or cut off wavelength;
- the profile may be optimized for high data rate, WDM systems; and,
- the profile may be optimized for use with optical amplifiers, especially where spacing between repeaters is large.

Although specific embodiments of my invention have hereinbefore been disclosed and described, it will be understood that the scope of my invention is nevertheless to be defined by the following claims.

I claim:

1. A single mode optical waveguide fiber comprising:

a core region comprising, a central region having a radius $a_0$ and a minimum refractive index $n_0$, at least one annular region surrounding said central region, wherein the innermost of said at least one annular region is adjacent said central region and has inner radius $a_i$ and minimum refractive index $n_i$, and $a_i>a_0$ and $n_i>n_0$; and, a clad layer adjacent said core region having refractive index $n_c$ and $n_c<n_i$.

2. The single mode optical waveguide of claim 1 wherein the respective refractive indices of said central region and said at least one annular region vary along the radius of said core.

3. The single mode optical waveguide of claim 2 wherein the respective refractive indices of said central region and said at least one annular region of said core are cylindrically symmetrical.

4. The single mode optical waveguide fiber of claim 1 wherein said central core region is surrounded by one adjacent annular region.

5. The single mode optical waveguide fiber of claim 4 wherein said one annular region has a substantially constant refractive index.

6. The single mode optical waveguide fiber of claim 5 wherein said central region has a substantially constant refractive index.

7. The single mode optical waveguide fiber of claim 6 wherein $n_0$ is substantially equal to $n_c$.

8. The single mode waveguide fiber of claim 1 further including at least one annular region in said clad layer having a refractive index less than $n_c$.

9. The single mode waveguide fiber of claim 1 further including at least one annular region in said central core region having a refractive index less than $n_c$.

10. The single mode optical waveguide fiber of claim 1 wherein said central core region is surrounded by a first and a second annular region, wherein said first annular region is adjacent said central region and said second annular region is adjacent said first annular region.

11. The single mode optical waveguide of claim 10 wherein said respective first and second annular regions have minimum refractive indices $n_1$ and $n_2$, and $n_1>n_0$ and $n_2>n_0$.

12. The single mode optical fiber of claim 1 wherein the index of refraction of the central region is greater than the clad layer and is equal to or less than about 11% of the index of retraction of said at least one annular region surrounding the central region.

13. A single mode optical waveguide fiber comprising:

a core region comprising, a central region having a radius $a_0$ of substantially constant refractive index $n_0$, at least one annular region having a radius $a_1$ surrounding said central region, the innermost annular region is adjacent said central region and has minimum refractive index $n_i$ and $n_i>n_0$;

a clad layer surrounding said core region having refractive index $n_c$;

characterized in that the ratio $a_0/a_1$ is in the range of 0.55 to 0.75 and the total dispersion slope is less than about 0.075 ps/nm$^2$-km.

14. The single mode optical waveguide fiber of claim 13 characterized in that core radius is in the range of about 3.5 to 3.9 microns and the zero dispersion wavelength is substantially constant for about 5% variations from target of core radius or cut off wavelength.

15. The single mode optical waveguide fiber of claim 13 characterized in that the core radius is greater than about 3.4 microns and the zero dispersion wavelength is outside the range of about 1530 nm to 1565 nm.

16. The single mode optical waveguide fiber of claim 13 characterized in that the core radius is between 3.4 and 3.5 microns and the zero dispersion wavelength is in the range of about 1500 nm to 1530 nm.

17. A single mode optical waveguide fiber comprising:

a core region comprising an [axially symmetric] central region having minimum refractive index $n_0$, an [axially symmetric] annular region adjacent said central region, having minimum refractive index $n_1$, inner radius $a_i$, and outer radius $a_o$, wherein $n_1>n_0$ and the ratio $a_i/a_o$ is in the range 0.35 to 0.80, and;

a clad layer surrounding said core having refractive index $n_c$ and $n_1>n_c$.

18. The single mode fiber of claim 17 wherein the ratio $a_i/a_o$ is about 0.50.

19. The single mode optical waveguide fiber of claim 17 wherein $n_0$ is substantially constant.

20. The single mode optical waveguide fiber of claim 19 wherein $n_0$ is substantially equal to $n_c$.

21. The single mode optical waveguide fiber of claim 20 wherein $n_1$ is substantially constant.

22. The single mode optical waveguide fiber of claim 21 wherein $n_1$ is in the range of about 1.4700 to 1.4800.

*23. A single mode optical waveguide fiber comprising:*

*a core region comprising,*

*a central region having a radius $a_0$ and of substantially constant refractive index $n_0$,*

*at least one annular region having a radius $a_i$ and surrounding said central region, the innermost annular region is adjacent said central region and has minimum refractive index $n_i$ and $n_i>n_0$;*

*a clad layer surrounding said core region having refractive index $n_c$;*

*wherein the ratio $a_0/a_i$ is one selected from the group consisting of (a) a range of 0.35 to 0.45, (b) a range of 0.45 to 0.55, and (c) a ratio in the range of about 0.55 to 0.75; and*

*wherein the core radius is in a range of about 3.0 to 3.9 microns and the zero dispersion wavelength is in a range of about 1570 nm to 1455 nm.*

*24. A single mode optical waveguide fiber comprising:*

*a core region comprising,*

*a central region having a radius $a_0$ and of substantially constant refractive index $n_0$,*

*at least one annular region having a radius $a_i$ and surrounding said central region, the innermost annular region is adjacent said central region and has minimum refractive index $n_i$ and $n_i>n_0$;*

*a clad layer surrounding said core region having refractive index $n_c$;*

*wherein the ratio $a_0/a_i$ is one selected from the group consisting of (a) a range of 0.35 to 0.45, (b) a range of 0.45 to 0.55, and (c) a ratio in the range of about 0.55 to 0.75; and*

*wherein the index of refraction of the central region is greater than the clad layer and is equal to or less than about 11% of the index of refraction of said at least one annular region surrounding the central region.*

*25. A single mode optical waveguide fiber comprising:*

*a core region comprising,*

*a central region having a radius $a_0$ and of substantially constant refractive index $n_0$,*

*at least one annular region having a radius $a_i$ and surrounding said central region, the innermost annular region is adjacent said central region and has minimum refractive index $n_i$ and $n_i>n_0$;*

*a clad layer surrounding said core region having refractive index $n_0$;*

*wherein the ratio $a_0/a_i$ is one selected from the group consisting of (a) a range of 0.35 to 0.45, (b) a range of 0.45 to 0.55, and (c) a ratio in the range of about 0.55 to 0.75; and*

*wherein the total dispersion between 1520 and 1600 nm is in a range of from about 0.5 to 4 ps/nm-km.*

*26. A single mode optical waveguide fiber comprising:*

*a core region comprising,*

*a central region having a radius $a_0$ and of substantially constant refractive index $n_0$,*

*at least one annular region having a radius $a_i$ and surrounding said central region, the innermost annular region is adjacent said central region and has minimum refractive index $n_i$ and $n_i>n_0$;*

*a clad layer surrounding said core region having refractive index $n_c$;*

*wherein the ratio $a_0/a_i$ is one selected from the group consisting of (a) a range of 0.35 to 0.45, (b) a range of 0.45 to 0.55, and (c) a ratio in the range of about 0.55 to 0.75; and*

*wherein the core radius is in a range of about 3.5–3.9 microns and the zero dispersion wavelength is substantially constant for about 5% variations from target of core radius or cut off wavelength.*

*27. A single mode optical waveguide fiber comprising:*

*a core region comprising,*

*a central region having a radius $a_0$ and of substantially constant refractive index $n_0$,*

*at least one annular region having a radius $a_i$ and surrounding said central region, the innermost annular region is adjacent said central region and has minimum refractive index $n_i$ and $n_i>n_0$;*

*a clad layer surrounding said core region having refractive index $n_c$;*

*wherein the ratio $a_0/a_i$ is one selected from the group consisting of (a) a range of 0.35 to 0.45, (b) a range of 0.45 to 0.55, and (c) a ratio in the range of about 0.55 to 0.75; and*

*wherein the core radius is greater than about 3.4 microns and the zero dispersion wavelength is outside the range of about 1530 nm to 1565 nm.*

*28. A single mode optical waveguide fiber comprising:*

*a core region comprising,*

*a central region having a radius $a_0$ and of substantially constant refractive index $n_0$,*

*at least one annular region having a radius $a_i$ and surrounding said central region, the innermost annular region is adjacent said central region and has minimum refractive index $n_i$ and $n_i > n_0$;*

*a clad layer surrounding said core region having refractive index $n_c$;*

*wherein the ratio $a_0/a_i$ is one selected from the group consisting of (a) a range of 0.35 to 0.45, (b) a range of 0.45 to 0.55, and (c) a ratio in the range of about 0.55 to 0.75; and*

*wherein the core radius is between 3.4 and 3.5 microns and the zero dispersion wavelength is in the range of about 1500 nm to 1530 nm.*

*29. The single mode fiber of claim 17, wherein minimum refractive indices $n_1$ and $n_0$ and radii $a_i$ and $a_0$ are selected to provide a dispersion slope which is less than 0.075 ps/nm$^2$-km.*

*30. The single mode optical fiber of claim 17, wherein the zero dispersion wavelength is outside the wavelength range of about 1530 to 1565 nm.*

*31. The single mode optical fiber of claim 29, wherein the zero dispersion wavelength is outside the wavelength range of about 1530 to 1565 nm.*

*32. The single mode optical waveguide fiber of claim 17, wherein the radii and refractive index profiles of the central region and annular region are selected to provide a total dispersion which is in the range of about 0.5 to 4 ps/nm-km over the wavelength range from about 1520 to 1600.*

*33. The single mode fiber of claim 29, wherein the mode field diameter of said fiber is greater than or equal to about 8 microns.*

* * * * *

UNITED STATES PATENT AND TRADEMARK OFFICE

CERTIFICATE OF CORRECTION

PATENT NO. : RE 37,680 E
DATED : April 30, 2002
INVENTOR(S) : Bhagavatula Venkata A It is certified that error appears in the above-identified patent and that said Letters Patent is hereby corrected as shown below:

Column 9,
Line 2, "of retraction of said at least one annular region surrounding", should be,
-- of refraction of said at least one annular region surrounding --
Line 18, "characterized in that core radius is in the range of about 3.5", should be,
-- characterized in that the core radius is in the range of about 3.5 --

Signed and Sealed this

Fourth Day of March, 2003

JAMES E. ROGAN
*Director of the United States Patent and Trademark Office*